US006547913B1

(12) United States Patent
Libby et al.

(10) Patent No.: US 6,547,913 B1
(45) Date of Patent: Apr. 15, 2003

(54) APPARATUS FOR CONVEYING AN ADHESIVELY COATED SCRAP LATTICE WEB

(75) Inventors: Terry L. Libby, Powell, OH (US); Dave G. Moulden, Springfield, OH (US); Robert D. Simon, Gahanna, OH (US)

(73) Assignee: Airtrim, Inc., Springfield, OH (US)

(*) Notice: Subject to any disclaimer, the term of this patent is extended or adjusted under 35 U.S.C. 154(b) by 102 days.

(21) Appl. No.: 09/657,244

(22) Filed: Sep. 7, 2000

(51) Int. Cl.[7] .......................... B32B 31/18; B32B 35/00

(52) U.S. Cl. ....................... 156/248; 156/247; 156/267; 156/269; 156/344; 156/584

(58) Field of Search ................................ 156/584, 344, 156/247, 248, 267, 269, 270, 271, 510, 522, 528, 268; 211/73; 100/2, 3; 248/94; 141/332, 340

(56) References Cited

U.S. PATENT DOCUMENTS 664,075 A * 12/1900 Berry ......................... 141/340
3,522,136 A * 7/1970 Williams et al. ............ 156/384
4,282,056 A * 8/1981 Okui .......................... 156/519
4,599,125 A * 7/1986 Buck .......................... 156/248
5,283,121 A * 2/1994 Bordner ...................... 428/381
6,024,141 A * 2/2000 Wegman ...................... 141/59

* cited by examiner

*Primary Examiner*—Richard Crispino
*Assistant Examiner*—George R. Koch, III
(74) *Attorney, Agent, or Firm*—Jacox, Meckstroth & Jenkins

(57) ABSTRACT

A web of pressure sensitive adhesive label material is releasably attached to a paper carrier web, and the combined webs are continuously fed through a label printer and die cutter, and a scrap lattice web of the label material is continuously separated from the carrier web. The lattice web with adhesive on one side is directed into a curling and pneumatic conveyor apparatus. The apparatus includes a condensing member or curling cone with a converging wall having a rough low friction inner surface which curls, folds and collapses the scrapped lattice web into a rope-like mass or body which is pulled by suction air flowing inwardly through an air inlet surrounding the body. The suction air pulls the body into the center portion of a pneumatic conveyor duct to provide for conveying the rope-like body for a substantial distance to a remotely located waste receptacle.

4 Claims, 1 Drawing Sheet

APPARATUS FOR CONVEYING AN ADHESIVELY COATED SCRAP LATTICE WEB

BACKGROUND OF THE INVENTION

In the production of a large volume of pressure sensitive labels, it is common to feed a web of pressure sensitive adhesive label material releasably attached to a paper backing or carrier web from a supply roll into a printing press or station where the labels are printed. The combined webs are then fed through a rotary die cutter which die-cuts the labels on the paper carrier web and also forms a skeleton or lattice from the web of label material. The lattice is then peeled away from the carrier web as scrap and wound into a roll of scrap lattice material. When the wound roll of lattice material arrives at a certain diameter and weight, the label production machine or system is stopped in order to remove the wound roll of lattice material and to start a new roll. This operation involves downtime of the label production machine and also requires additional labor to lift and remove the scrap roll of lattice material from the label production machine and to transport the roll on a pallet to a scrap storage area or a large waste receptacle. It is also known to direct the scrap skeleton web or lattice into a suction hood and duct work which conveys the lattice with exposed adhesive a short distance to a trash receptacle located close to the label production machine. However, the exposed adhesive on the lattice web sometimes causes the lattice web to stick or drag on the conveyor duct, and frequently, there is no space to locate a large scrap receptacle close to the label production machine.

SUMMARY OF THE INVENTION

The present invention is directed to an improved system or apparatus for continuously removing and conveying a scrap lattice of adhesive label material and which provides for conveying the scrap lattice over a long distance through an air suction conveyor duct. Thus the lattice may be continuously conveyed to a remotely located large scrap container, thereby eliminating the above described downtime of the label production machine and the labor involved in handling and transporting scrap lattice rolls. In accordance with one embodiment of the invention, a web of scrap skeleton or lattice with exposed adhesive on one side is directed into a curling device or cone which curls, folds and rolls the lattice web into a condensed and concentrated rope-like body with the adhesive on the strips facing inwardly.

The rope-like body of scrap lattice material is sucked into the center portion of a pneumatic conveyor duct by air flowing through an annular inlet surrounding the body as it exits the curling device. Thus the body of scrap lattice material is entrained in the center of the duct where the air velocity is greatest, thereby minimizing the chance of any exposed adhesive on the outer surface of the body attaching or dragging on the inner surface of the conveyor duct. The inner surface of the curling cone is flame sprayed with a metallic compound to produce a rough and abrasive interior surface, and this surface is coated with a silicone polymer to provide a slick and non-sticky rough inner surface so that the adhesive on the lattice web will not adhere to the curling cone.

Other features and advantages of the invention will be apparent from the following description, the accompanying drawing and the appended claims.

DESCRIPTION OF THE PREFERRED EMBODIMENT

Figure 1:
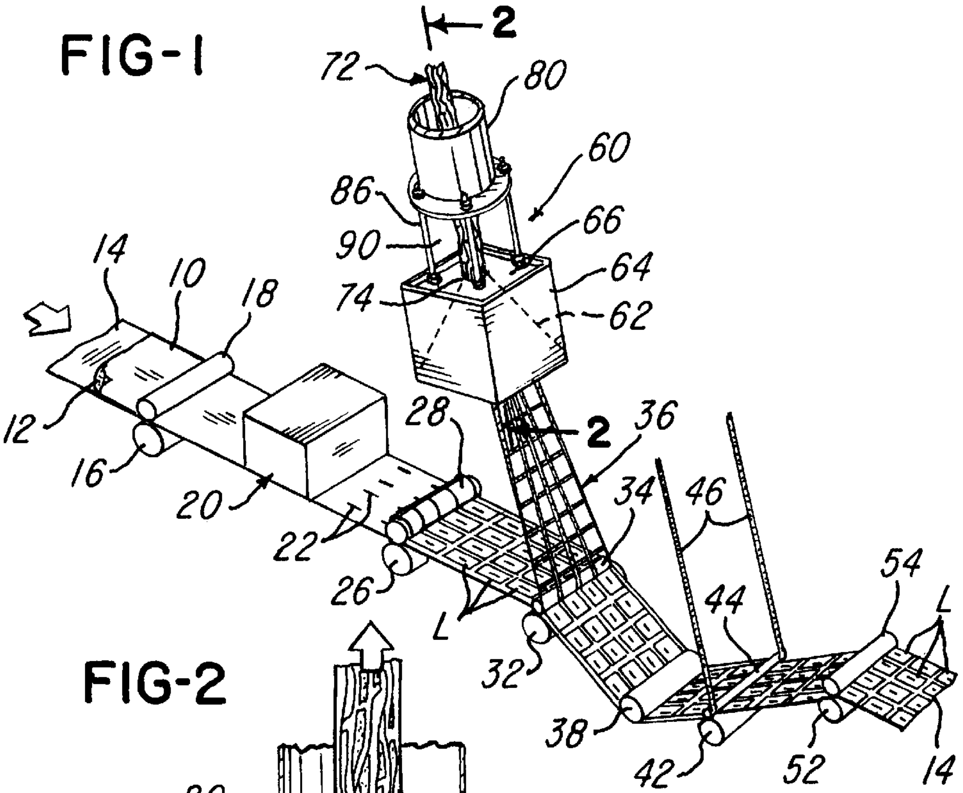
FIG. 1 is a diagrammatic perspective view of a label production machine provided with continuous lattice removing, curling and conveying apparatus constructed in accordance with the invention.
Figure 2:
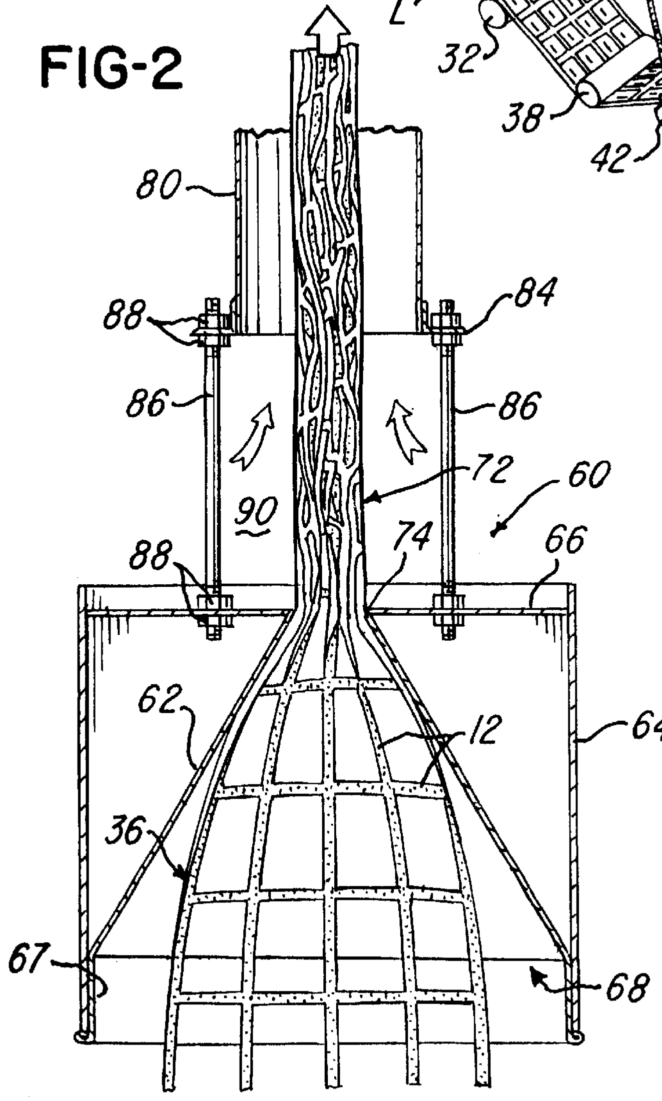
FIG. 2 is an axial section of the apparatus taken generally on the line 2—2 of FIG. 1 and illustrating the curling of the lattice web into a condensed rope-like mass or body and pneumatically conveying the body through the center portion of an air conveyor duct.

FIG. 1 illustrates several basic components of a conventional machine for producing pressure sensitive labels from a supply roll (not shown) of a web 10 of label material which may be, for example, paper, plastics film or metal foil. The web 10 has an underside coated with pressure sensitive adhesive 12 which releasably attaches the web 10 to a backing or carrier web 14 commonly formed of paper. The combined webs 10 and 14 are pulled from the supply roll by a driven feed roll 16 and a pinch roll 18, and the combined webs are then directed or fed into a printing press or station 20 which prints laterally spaced text, and/or numbers, and/or artwork on the label material web 10 at longitudinally spaced intervals, diagrammatically illustrated by laterally spaced lines 22. The combined printed web 10 and carrier web 14 are then directed between rotary die cutter rolls 26 and 28 which die-cut the label material web 10 to define longitudinally spaced and laterally spaced pressure sensitive adhesive labels L. As used herein, the term label includes any form of label, stamp or other article releasably attached to a carrier web.

The die cut label web 10 and paper carrier web 14 are then directed between a set of separating rolls 32 and 34 where a skeleton or lattice web 36 of the label material is peeled from the carrier web 14, and the printed labels L are carried by the carrier web 14 around a guide roll 38 and between a set of trim rolls 42 and 44. The marginal edge portions 46 of the combined webs are trimmed from the carrier web 14 by the trim rolls 42 and 44, and the edge trim portions 46 of the webs 10 and 14 are directed to a suction duct or pneumatic conveyor which delivers the trim portions to a scrap container or receptacle. The carrier web 14 with the releasably attached pressure sensitive labels L is directed between feed rolls 52 and 54 and then to a rewind station (not shown) where the web of labels is rewound into a label roll or to a cutoff station where the carrier web is cut at longitudinally spaced intervals to form sheets of releasably attached pressure sensitive adhesive labels.

In accordance with the present invention, the lattice web 36 having adhesive on one side, is directed into a lattice curling and conveyor system or apparatus 60 which includes a sheet metal tapered curling member or cone 62 enclosed within a surrounding housing 64 having a top wall 66. The lower edge portion 67 of the curling member or cone 62 defines a web inlet or intake 68 which is sufficiently wide to receive the lattice web 36. The tapered or converging wall or walls of the curling cone 62 are effective to curl and roll and fold the lattice web 36 into a condensed and concentrated rope-like mass or body 72 having a diameter which is determined by the diameter of a circular outlet 74 within the top wall 66 of the housing 64 and at the apex of the curling cone 62. Preferably, the curling member or cone 62 has a rough and slick interior surface produced by flame spraying a metallic compound on the metal surface of the cone. The rough surface is then coated with a silicone polymer release material to form a slick or non-sticky low friction rough inner surface. This rough and slick surface prevents any significant drag or attachment of any exposed adhesive on the lattice web 36 as it is being rolled, folded and curled or collapsed into the rope-like body 72.

The lattice web 36 and the condensed body 72 of lattice material is continuously pulled into an inlet of a pneumatic conveyor duct 80 which extends a substantial distance to a large waste container. The inlet of the duct 80 has a bottom peripheral flange 84 which is spaced from the top wall 66 of the housing 64 and is secured to the top wall by four spacer bolts 86 each having threaded opposite end portions which receive a pair of nuts 88. The space between the flange 84 and the top housing wall 66 defines an annular air intake 90 surrounding the rope-like body 72 of curled and condensed lattice web material. The uniform annular flow of air into the duct 80 entrains the body 72 within the center portion of the conveyor duct where the air velocity is greatest. As a result, there is substantially no chance of any exposed adhesive on the body 72 dragging on or attaching to the inner surface of the pneumatic conveyor duct.

From the drawing and the above description, it is apparent that a label production machine incorporating lattice curling and conveyor apparatus constructed in accordance with the present invention, provides desirable features and advantages. For example, the apparatus 60 is effective to reduce the adhesively coated lattice web 36 to a rope-like lattice body 72 with most of the adhesive on the lattice web facing inwardly of the body 72 and not exposed on the outer surface of the body 72. As a result, the apparatus of the invention provides for continuously removing the lattice web 36 and continuously conveying the web in a rope-like form through a pneumatic conveyor duct which may extend a long distance to a remote waste container or receptacle. In addition, the rough and slick interior surface of the curling member or cone 62 avoids any exposed adhesive on the lattice web 36 from attaching to or dragging on the curling cone 62 so that there is no restriction on the continuous smooth flow of the lattice body 72 through the cone 62.

As another feature, the annular air intake between the inlet of the duct 80 and the top housing wall 66 produces a uniform air flow around the body 72 which directs or entrains the rope-like lattice body 72 spaced within the center portion of the pneumatic conveyor duct where the air velocity is greatest. The apparatus of the invention thus eliminates downtime of the label production machine and enables the use of a large supply roll for the combined webs 10 and 14 in order to have a large label production run. Furthermore, since the condensed rope-like concentrated mass or body 72 of the lattice web 36 may be conveyed by the pneumatic conveyor over a long distance to a remotely located large scrap container, the apparatus of the invention eliminates the need for labor to handle and transport palletized rolls of rewound lattice web.

While the form of apparatus herein described constitutes a preferred embodiment of the invention, it is to be understood that the invention is not limited to this precise form of apparatus, and that changes may be made therein without departing from the scope and spirit of the invention as defined in the appended claims. For example, with some lattice webs 36, the spacer bars or rods 86 may be eliminated, and all of the air for the conveyor duct 80 may be pulled in through the outlet 74 of the curling or condensing member 62.

What is claimed is:

1. A method of continuously removing and conveying a scrap lattice web of material having adhesive on one side and separated from die-cut pressure sensitive labels releasably attached to a carrier web, said method comprising the steps of directing the lattice web into an inlet of a condensing member, progressively condensing the lattice web with the condensing member into a continuous rope-like body of material with the adhesive holding the body together, directing the body from an outlet of the condensing member into an inlet of a pneumatic conveyor duct, and directing air flow into the inlet of the duct around the body of material for spacing the body of material from an inner surface of the duct while conveying the body through the duct.

2. A method as defined in claim 1 wherein the lattice web is curled and rolled together by the condensing member and exits through a generally circular outlet to form the rope-like body.

3. A method as defined in claim 2 wherein the inlet of the conveyor duct is generally circular and substantially larger than the outlet of the condensing member, and positioning the inlet of the conveyor duct in substantial alignment with the outlet of the condensing member for positioning the rope-like body generally within a center portion of the conveyor duct.

4. A method as defined in claim 1 including the step of forming the condensing member in the general shape of a cone.

* * * * *